(12) United States Patent
Khizroev et al.

(10) Patent No.: US 6,876,518 B2
(45) Date of Patent: Apr. 5, 2005

(54) PERPENDICULAR MAGNETIC RECORDING HEAD

(75) Inventors: Sakhrat Khizroev, Pittsburgh, PA (US); Dmitri Litvinov, Pittsburgh, PA (US); Billy Wayne Crue, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 45 days.

(21) Appl. No.: 10/279,328

(22) Filed: Oct. 24, 2002

(65) Prior Publication Data

US 2003/0039064 A1 Feb. 27, 2003

Related U.S. Application Data

(62) Division of application No. 09/667,105, filed on Sep. 21, 2000, now Pat. No. 6,513,228.
(60) Provisional application No. 60/174,519, filed on Jan. 5, 2000.

(51) Int. Cl.[7] ............................................. G11B 5/187
(52) U.S. Cl. ......................................................... 360/122
(58) Field of Search .................................. 360/122, 123, 360/317

(56) References Cited

U.S. PATENT DOCUMENTS

| | | | |
|---|---|---|---|
| 4,078,300 A | 3/1978 | Lazzari | 29/603 |
| 4,138,702 A | 2/1979 | Magnenet | 360/125 |
| 4,413,297 A * | 11/1983 | Tanaka et al. | 360/119 |
| 4,438,471 A | 3/1984 | Oshiki et al. | 360/125 |
| 4,546,398 A | 10/1985 | Toda et al. | 360/126 |
| 4,639,811 A * | 1/1987 | Diepers et al. | 360/125 |
| 4,649,449 A | 3/1987 | Sawada et al. | 360/123 |
| 4,652,956 A * | 3/1987 | Schewe | 360/123 |
| 4,652,957 A * | 3/1987 | Schewe et al. | 360/125 |
| 4,672,494 A | 6/1987 | Furuya et al. | 360/125 |
| 4,675,766 A * | 6/1987 | Schewe | 360/123 |
| 4,685,014 A | 8/1987 | Hanazono et al. | 360/126 |
| 4,703,380 A | 10/1987 | Imamura et al. | 360/121 |
| 4,745,506 A | 5/1988 | Nakamura et al. | 360/123 |
| 4,764,833 A | 8/1988 | Imamura et al. | 360/126 |
| 4,809,103 A | 2/1989 | Lazzari | 360/103 |
| 4,839,761 A | 6/1989 | Gatzen | 360/103 |
| 4,873,599 A | 10/1989 | Sueoka | 360/126 |
| 4,899,434 A | 2/1990 | Roberts | 29/603 |
| 4,974,110 A | 11/1990 | Kanamine et al. | 360/126 |
| 4,982,301 A | 1/1991 | Endo | 360/125 |
| 5,073,836 A | 12/1991 | Gill et al. | 360/113 |
| 5,105,408 A * | 4/1992 | Lee et al. | 369/44.15 |
| 5,124,961 A * | 6/1992 | Yamaguchi et al. | 369/300 |
| 5,196,976 A | 3/1993 | Lazzari | 360/113 |
| 5,197,050 A * | 3/1993 | Murakami et al. | 369/13.13 |
| 5,615,183 A * | 3/1997 | Ishii | 369/13.23 |
| 5,615,203 A * | 3/1997 | Fukakusa | 720/682 |
| 5,703,740 A * | 12/1997 | Cohen et al. | 360/126 |
| 5,738,927 A | 4/1998 | Nakamura et al. | 428/141 |
| 5,831,797 A * | 11/1998 | Schaenzer et al. | 369/13.12 |
| 5,875,080 A * | 2/1999 | Seagle | 360/123 |
| 5,881,042 A * | 3/1999 | Knight | 369/99 |
| 5,991,126 A | 11/1999 | Hayashi et al. | 360/125 |
| 6,104,675 A * | 8/2000 | Hatam-Tabrizi | 369/13.28 |

(Continued)

FOREIGN PATENT DOCUMENTS

| | | | |
|---|---|---|---|
| JP | 10-255205 | 9/1998 | |
| JP | 10255205 A * | 9/1998 | G11B/5/02 |

Primary Examiner—David Davis
(74) Attorney, Agent, or Firm—Kinney & Lange, P.A.

(57) ABSTRACT

A perpendicular magnetic recording head having an air bearing surface and comprising a substantially planar top pole and a shared pole is disclosed. The top pole and shared pole are connected distally from the air bearing surface by a yoke. A conductive coil wraps around the top pole and is positioned adjacent to the air bearing surface, with a lower portion of the coils extending between the top pole and the shared pole.

20 Claims, 9 Drawing Sheets

U.S. PATENT DOCUMENTS

| | | | |
|---|---|---|---|
| 6,195,232 B1 * | 2/2001 | Cohen ........................ | 360/126 |
| 6,195,872 B1 | 3/2001 | Sasaki ..................... | 29/603.13 |
| 6,226,149 B1 | 5/2001 | Dill, Jr. et al. ............. | 360/126 |
| 6,256,864 B1 | 7/2001 | Gaud et al. .............. | 29/603.13 |
| 6,275,354 B1 * | 8/2001 | Huai et al. .................. | 360/126 |
| 6,325,947 B1 | 12/2001 | Garfunkel et al. ............ | 216/22 |
| 6,441,994 B1 * | 8/2002 | Wang et al. ................ | 360/123 |
| 6,513,228 B1 * | 2/2003 | Khizroev et al. ........ | 29/603.14 |
| 2002/0060879 A1 | 5/2002 | Sato | |

\* cited by examiner

PERPENDICULAR MAGNETIC RECORDING HEAD

CROSS-REFERENCE TO RELATED APPLICATION(S)

This application is a division of Ser. No. 09/667,105, filed Sep. 21, 2000 now U.S. Pat. No. 6,513,228, which claims priority from Provisional Application No. 60/174,519 filed Jan. 5, 2000, for "Highly Efficient Write Head for Perpendicular Recording" by S. Khizroev, D. Litvinov, and B. Crue.

BACKGROUND OF THE INVENTION

The present invention relates generally to the field of electronic data storage and retrieval, and more particularly to a perpendicular magnetic recording head having a coil formed on a planar surface and wrapped around the top writing pole.

A magnetic recording head generally consists of two portions, a writer portion for storing magnetically-encoded information on a magnetic disc and a reader portion for retrieving that magnetically-encoded information from the disc. The reader portion typically consists of a bottom shield, a top shield, and a sensor, often composed of a magnetoresistive (MR) material, positioned between the bottom and top shields. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the data that was encoded on the disc.

The writer portion of the magnetic recording head typically consists of a top pole and a bottom pole, which are separated from each other at an air bearing surface of the writer by a gap layer, and which are connected to each other at a region distal from the air bearing surface by a back via. Positioned between the top and bottom poles are one or more layers of conductive coils encapsulated by insulating layers, which typically form a hill which is thinner near the air bearing surface than it is toward the center of the writer. The shape of the top pole, which is formed on this hill, typically follows the contour of the hill. The air bearing surface is the surface of the recording head immediately adjacent the magnetic medium or disc. The writer portion and the reader portion are often arranged in a merged configuration in which a shared pole serves as both the top shield of the reader portion and the bottom pole of the writer portion.

To write data to the magnetic medium, an electrical current is caused to flow through the conductive coils, thereby inducing a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

A common configuration for the conductive coils within the writer is a "pancake" coil configuration in which the coils wrap around the back via in a plane substantially normal to the air bearing surface. Because the pancake coils extend relatively far into the writer and away from the air bearing surface, the pancake coils are necessarily long. Additionally, the pancake coils are highly inefficient since the pancake coils wrap around only a small portion of the top pole (that is, only the back via), resulting in inefficient generation of magnetic flux in the pole for a given current through the coils. Accordingly, it is necessary to have greater number of coil turns around the back via to overcome this inefficiency of the pancake coils. Third, the frequency response of the writer is low due to the large number of coil turns required and the overall length thereof, as the greater length of the coils requires a greater amount of time to reverse the direction of current through the coils.

One solution to the pancake coil configuration of the conductive coils is the vertical (or solenoidal) coil configuration in which the coils are wrapped vertically around the top pole. In this configuration, a lower layer of coils is provided between the top and the bottom poles and an upper layer of coils is provided above the top pole. The upper and lower layers of coils are then connected to each other using conventional methods to form a single vertical coil.

The vertical coil configuration offers improved efficiency over the pancake coil configuration, in that a greater percentage of the top pole is wrapped by the coils, and thus requires fewer number of coil turns around the top pole. Additionally, the configuration allows for a shorter length of coil per coil turn. The shorter overall length of the vertical coil configuration thus offers improved frequency response over the pancake coil configuration.

Nonetheless, both of these prior art configurations have a distinct limitation. In both configurations, the top pole is formed over a mound of coils resulting in the top pole having a "bump" shape. As described above, the track width of the written data is defined by the width of the top pole at the air bearing surface. In both of these configurations, however, the portion of the top pole adjacent the air bearing surface is sloped. It is therefore difficult to precisely control the width of the top pole at the air bearing surface, particularly as the width necessarily becomes smaller to allow for greater data storage densities. This is particularly important in perpendicular recording devices designed to operate with extremely high data storage densities and small track widths. Perpendicular recording is similar to conventional longitudinal recording, except that data is recorded by magnetic flux flowing from the writer pole, through a recording layer of the magnetic medium, into a soft underlayer of the medium, and then back through a flux return pole of the writer. Accordingly, there is a need for a perpendicular recording write head with a planar top pole design that can efficiently function at high bit densities.

BRIEF SUMMARY OF THE INVENTION

The present invention is a perpendicular magnetic recording head having an air bearing surface and comprising a substantially planar top pole and a shared pole. The top pole and shared pole are connected distally from the air bearing surface by a yoke. A conductive coil wraps around the top pole and is positioned adjacent to the air bearing surface, with a lower portion of the coils extending between the top pole and the shared pole.

DETAILED DESCRIPTION OF THE PREFERRED EMBODIMENTS

Figure 1:
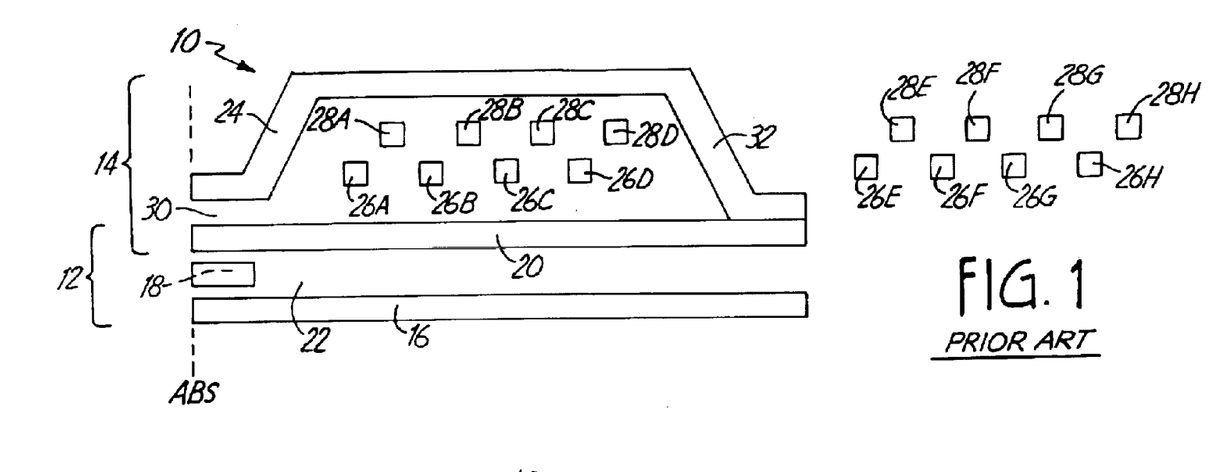
FIG. 1 is a cross-sectional view of a prior art magnetic recording head having a writer portion with pancake coils.

FIG. 1 is a cross-sectional view of a first type of prior art magnetic recording head 10 having reader portion 12 and writer portion 14. Reader portion 12 includes bottom shield 16, read element 18, shared pole 20 and read gap 22. Read element 18 is positioned between bottom shield 16 and shared pole 20 adjacent the air bearing surface (ABS) of magnetic recording head 10. Shared pole 20 acts as a top shield for reader 12 and as a bottom pole for writer 14. Read gap 22 serves to isolate read element 18 from both bottom shield 16 and shared pole 20.

Writer portion 14 includes shared pole 20, top pole 24, first pancake coil layer 26 (shown in cross-section as inner coils 26A–26D and outer coils 26E–26H), second pancake coil layer 28 (shown in cross-section as inner coils 28A–28D and outer coils 28E–28H), and write gap 30.

Inner coils 26A–26D and 28A–28D are located between top pole 24 and shared pole 20. Shared pole 20 is relatively planar in shape, while top pole 24 is bump-shaped, where the bump is defined by the layering of the inner coils between top pole 24 and shared pole 20. At the ABS of magnetic recording head 10, top pole 24 is separated from shared pole 20 by write gap 30. At a region of magnetic recording head 10 distal from the ABS, top pole 24 is in direct contact with shared pole 20 at back via 32. Top pole 24 is tapered at the ABS to define a track width of the data written to the magnetic media.

First pancake coil layer 26 is one continuous coil which wraps around back via 32 in a plane substantially normal to both the ABS of magnetic recording head 10 and to the plane of the paper in FIG. 1. In one embodiment of first pancake coil layer 26, the coils may be wrapped in the following order: 26D to 26E to 26C to 26F to 26B to 26G to 26A to 26H. Similarly, second pancake coil layer 28 is a single continuous coil which wraps around back via 32 in a plane substantially normal to both the ABS of magnetic recording head 10 and to the plane of the paper in FIG. 1. In one embodiment of second pancake coil layer 28, the coils may be wrapped in the following order: 28D to 28E to 28C to 28F to 28B to 28G to 28A to 28H. To form a single coil, rather than two coils, coil 26D may be connected to coil 28D. In this configuration of the coils, coils 26H and 28H serve as contacts to which current may be provided to the single continuous coil. Each of the individual coils 26A–26H and 28A–28H are separated from one another and from top and shared poles 24 and 20 by an insulating material.

To write magnetically-encoded data to the magnetic media, an electrical current is caused to flow through coil layers 26 and 28, thereby inducing a magnetic field across write gap 30 between top and shared poles 24 and 20. By reversing the polarity of the current through coil layers 26 and 28, the polarity of the data stored to the magnetic media is reversed.

Figure 2:
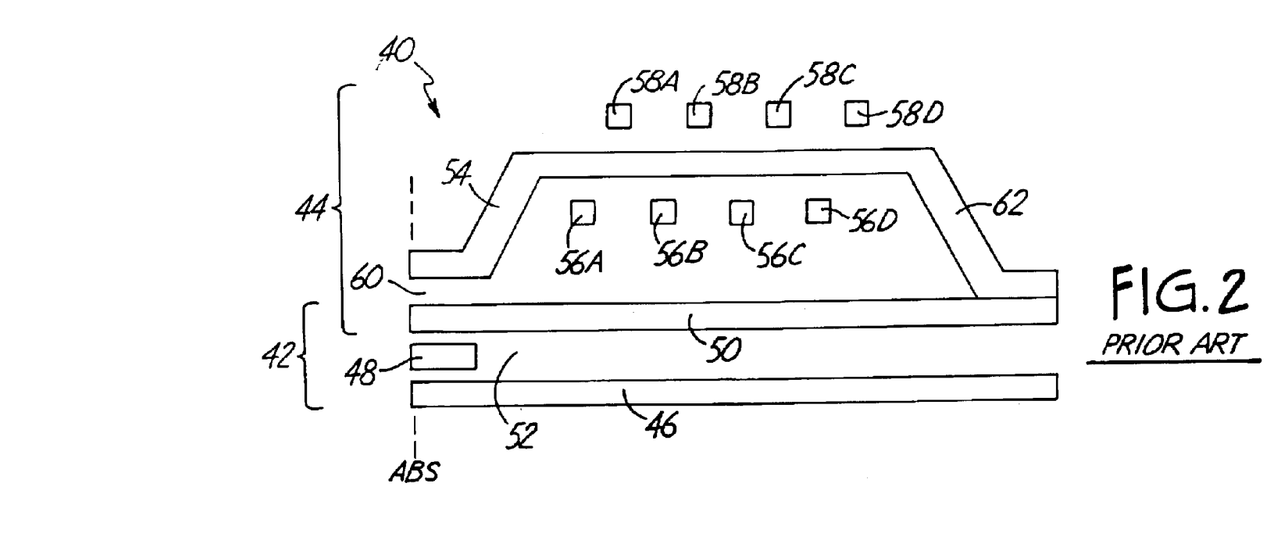
FIG. 2 is a cross-sectional view of a prior art magnetic recording head having a writer portion with vertical coils.

FIG. 2 is a cross-sectional view of a second type of prior art magnetic recording head 40 having reader portion 42 and writer portion 44. Reader portion 42 includes bottom shield 46, read element 48, shared pole 50 and read gap 52. Read element 48 is positioned between bottom shield 46 and shared pole 50 adjacent the ABS of magnetic recording head 40. Shared pole 50 acts as a top shield for reader 42 and as a bottom pole for writer 44. Read gap 52 serves to isolate read element 48 from both bottom shields 46 and shared pole 50.

Writer portion 44 includes shared pole 50, top pole 54, bottom coil layer 56 (shown in cross-section as coils 56A–56D), top coil layer 58 (shown in cross-section as coils 58A–58D), and write gap 60.

Bottom coil layer 56 is positioned between top pole 54 and shared pole 50, while top coil layer 58 is positioned on a side of top pole 54 opposite bottom coil layer 56. Shared pole 50 is relatively planar in shape, while top pole 54 is bump-shaped, the bump being defined by bottom coils 56A–56D between top pole 54 and shared pole 50. At the ABS of magnetic recording head 40, top pole 54 is separated from shared pole 50 by write gap 60. At a region of magnetic recording head 40 distal from the ABS, top pole 54 is in direct contact with shared pole 50 at back via 62. Top pole 54 is tapered at the ABS to define a track width of the data written to the magnetic media.

Bottom coil layer 56 and top coil layer 58 are joined together to form one continuously wound solenoidal coil which wraps around top pole 54 in a plane substantially normal to the plane of the paper of FIG. 2. In one embodiment of bottom and top coil layers 56 and 58, the solenoidal coil is wrapped in the following order: 56A to 58A to 56B to 58B to 56C to 58C to 56D to 58D, wherein coils 56A and 58D serve as contacts to which current may be provided through the solenoidal coil. Each of the individual coils 56A–56D and 58A–58D are separated from one another and from the top and shared poles 54 and 50 by an insulating material.

To write to the magnetic media, an electrical current is caused to flow through coil layers 56 and 58, thereby inducing a magnetic field across write gap 60 between top and shared poles 54 and 50. By reversing the polarity of the current through coil layers 56 and 58, the polarity of the data stored to the magnetic media is reversed.

Both prior art writer 10 (with pancake coils) and prior art writer 40 (with solenoidal coils) have a distinct limitation. In both writer 10 and writer 40, respective top pole 24 or 54 is formed over a mound of coils which results in top poles 24 and 54 having a bump shape. As described above, the track width of the written data is defined by the width of the top pole at the ABS. However, with top poles 24 and 54 both being sloped near the ABS, it is difficult to control their width at the ABS of respective magnetic recording heads 10 and 40. To allow for the continuing increases in data storage densities, better control of this critical dimension is necessary.

Figure 3:
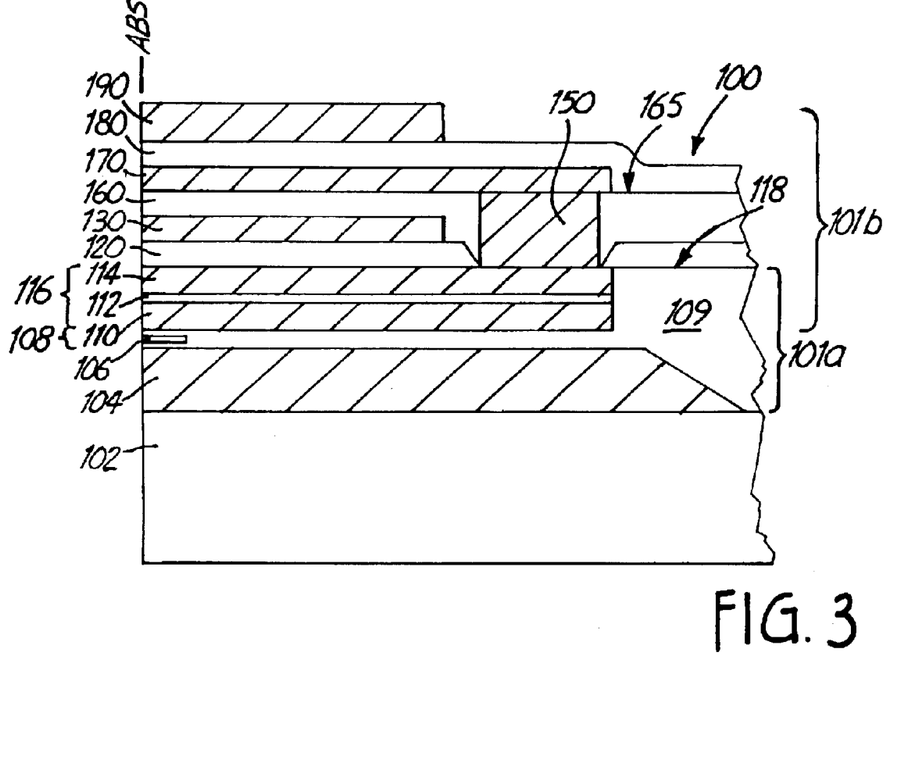
FIG. 3 is a cross-sectional view of a perpendicular recording head according to the present invention.

FIG. 3 is a cross-sectional view of perpendicular recording head 100 according to the present invention. Perpendicular recording head 100 includes both reader portion 101a and writer portion 101b formed on substrate 102. Reader portion 101a includes: bottom shield 104; MR sensor 106; read gap 108 (formed by read gap insulating layer 109); and top shield 110. Non-magnetic spacer 112 is optionally formed on top shield 110. Writer portion 101b includes: bottom pole 114 (which in combination with top shield 110 and optional spacer 112 forms shared pole 116) formed to create planar surface 118 at the top surfaces of bottom pole 114 and read gap insulation layer 109; first insulation layer 120; coil 130; back gap 140 having yoke 150 formed therein; second insulation layer 160 formed to create planar surface 165 at the top surface of second insulation layer 160 and yoke 150; top pole 170; third insulation layer 180; and coil 190. The details of the properties and fabrication procedures of the components of recording head 100 are described in more detail below, in conjunction with FIGS. 4a–4i.

Figure 4A:
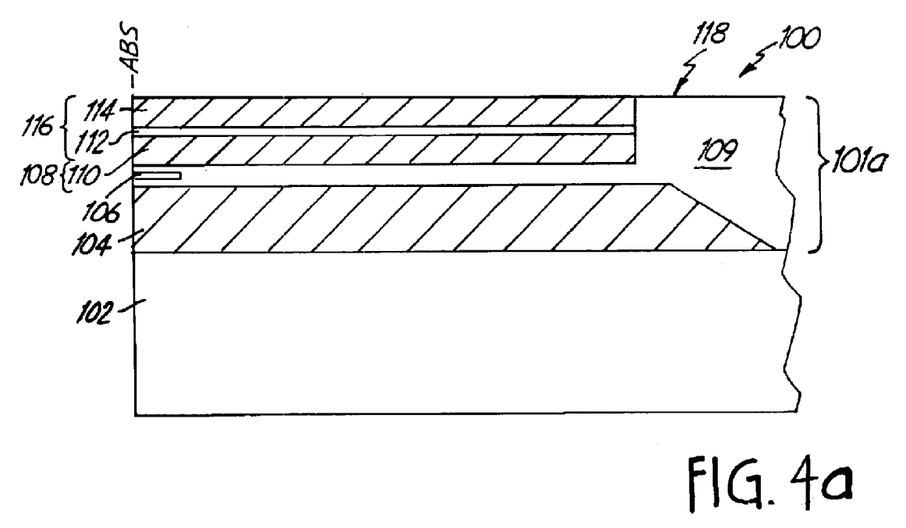
FIG. 4a is a cross-sectional view showing the first step of fabricating the perpendicular recording head according to the present invention.

FIG. 4a is a cross-sectional view showing the first step of fabricating perpendicular recording head 100 according to the present invention. In this first step, reader portion 101a is fabricated in a manner known in the art. Reader portion 101a includes substrate 102, bottom shield 104, MR sensor 106, read gap 108, and top shield 110. Bottom shield 104 is deposited on substrate 102. Bottom shield 104 and top shield 110 are preferably composed of a soft magnetic material with a high permeability and low magnetostriction, such as $Ni_{80}Fe_{20}$. MR sensor 106 is positioned in read gap 108 between top shield 110 and bottom shield 104. Read gap 108 is formed by read gap insulating layer 109 that isolates MR sensor 106 from top shield 110 and bottom shield 104.

In an exemplary embodiment, top shield 110, non-magnetic spacer 112, and bottom pole 114 are combined to form shared pole 116. Shared pole 116 serves as a top shield for reader 101a and a bottom pole for writer 101b (later described in FIGS. 4b–4i). The three-layer structure of shared pole 116 provides high shielding and writing performance, and suppresses the effects of writer 101b on reader 101a. Non-magnetic spacer 112 is composed of a non-magnetic insulator such as $Al_2O_3$ or $SiO_2$, or a conductor such as NiP, NiPd, and has a thickness from several dozen to several hundred nanometers. Non-magnetic spacer 112 prevents magnetic flux from propagating from writer portion 101b (FIGS. 4b–4i) to reader portion 101a during recording, and enhances the magnetic stability of the sensor. In an alternative embodiment (not shown), non-magnetic spacer 112 is eliminated, and top shield 110 and bottom pole 114 are combined to form a single layer structure. In this embodiment, the combined top shield/bottom pole layer is typically composed of a soft magnetic material with high permeability and low magnetostriction, such as Permalloy or Sendust. The larger size of the combined top shield/bottom pole layer, coupled with the insulator in the read gap, suppresses the effects of writer 101b on reader 101a. In both embodiments, shared pole 116 and read gap insulator 109 include a common top surface 118. Common top surface 118 is composed flat by chemical-mechanical polishing (CMP).

Figure 4B:
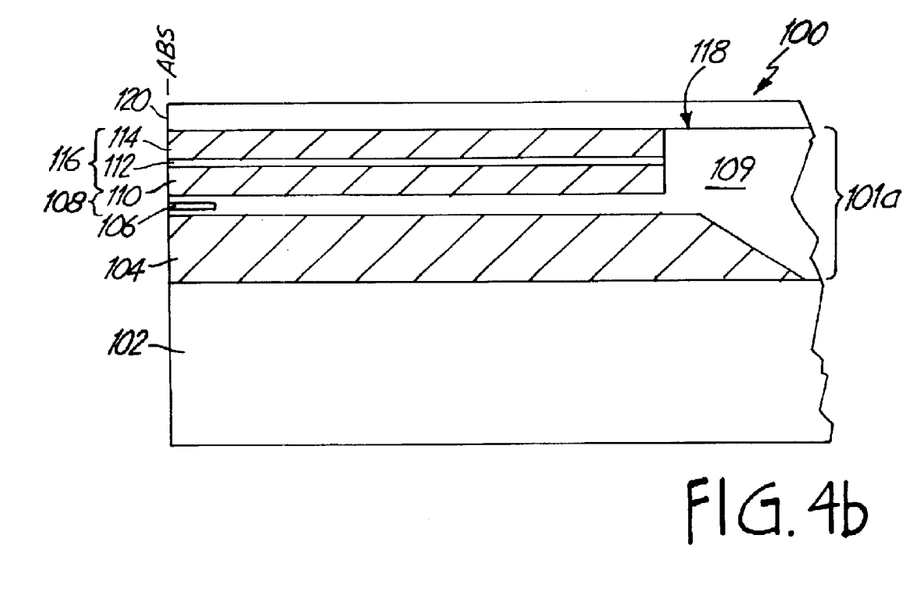
FIG. 4b is a cross-sectional view showing the second step of fabricating the perpendicular recording head according to the present invention.

FIG. 4b is a cross-sectional view showing the second step of fabricating a perpendicular recording head according to the present invention. First insulation layer 120 is deposited over common top surface 118 of reader 101a. This is typically accomplished by spin coating first insulation layer 120 over the entire wafer in a manner known in the art so as to achieve a uniform spread. First insulation layer 120 is preferably composed of a non-magnetic insulator such as $Al_2O_3$ or $SiO_2$.

Figure 4C:
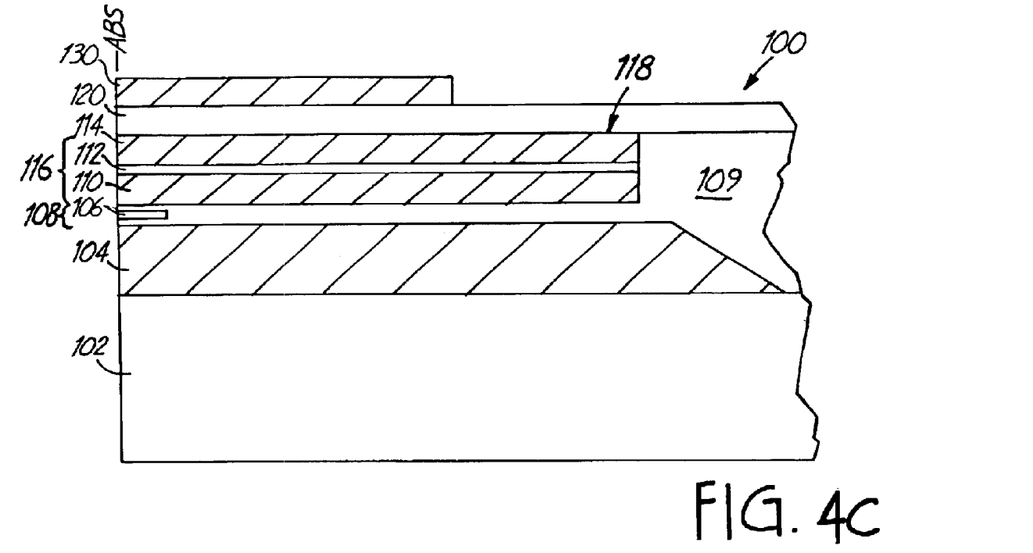
FIG. 4c is a cross-sectional view showing the third step of fabricating the perpendicular recording head according to the present invention.

FIG. 4c is a cross-sectional view showing the third step of fabricating a perpendicular recording head according to the present invention. Coil 130 is formed over first insulation layer 120. This is preferably accomplished using a plating process. To begin a typical plating process, a seed layer is formed over the area where coil 130 is to be formed. The device is then placed in a solution, or bath, of a salt of the coating metal and is connected to the negative terminal of an external source of electricity. Another conductor, often composed of the coating metal, is connected to the positive terminal of the electric source. A steady direct current at low voltage, usually from 1 to 6 volts, is required for the process. When the current is passed through the solution, atoms of the plating metal deposit out of the solution onto the cathode, the negative electrode. These atoms are replaced in the bath by atoms from the anode (positive electrode). An equilibrium between the metal exiting the solution and the metal entering the solution is maintained until coil 130 is formed.

Figure 4D:
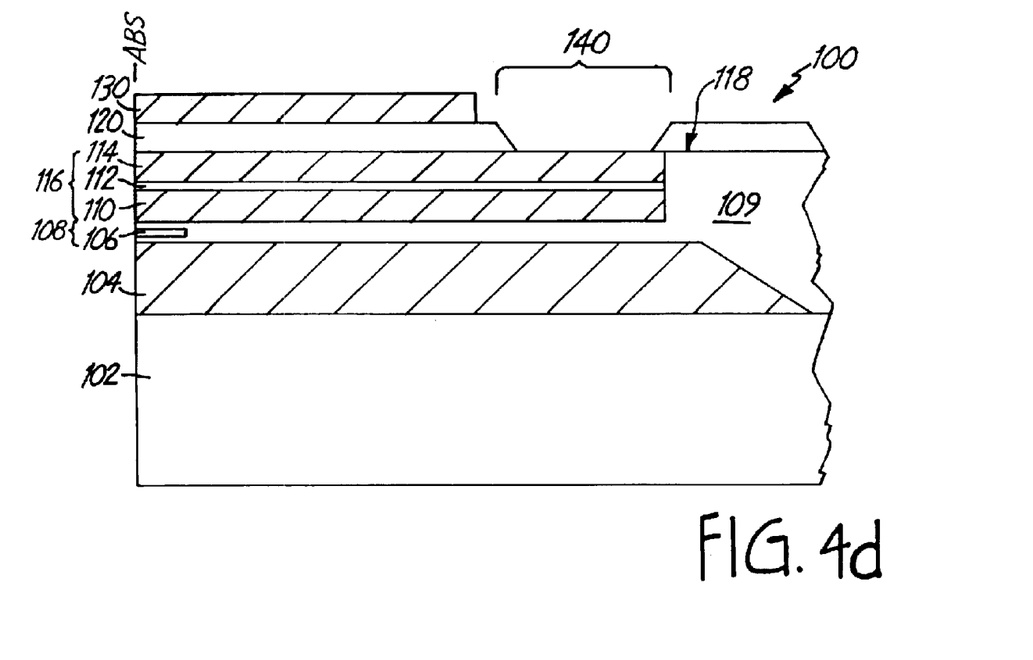
FIG. 4d is a cross-sectional view showing the fourth step of fabricating the perpendicular recording head according to the present invention.

FIG. 4d is a cross-sectional view showing the fourth step of fabricating a perpendicular recording head according to the present invention. In this step, a layer of photoresist (not shown) is spread over coil 130 and first insulation layer 120, leaving exposed a small area to be etched from insulation layer 120 at an end of coil 130 distal from the air bearing surface. Etching the exposed area results in the formation of back gap 140. The photoresist is then removed.

Figure 4E:
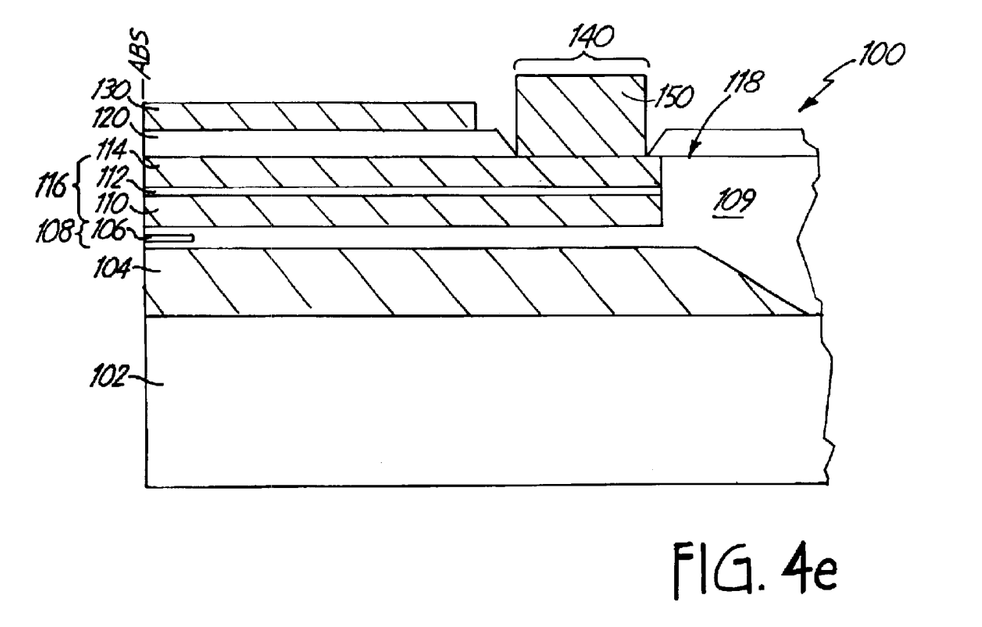
FIG. 4e is a cross-sectional view showing the fifth step of fabricating the perpendicular recording head according to the present invention.

FIG. 4e is a cross-sectional view showing the fifth step of fabricating a perpendicular recording head according to the present invention. Yoke 150 is formed in back gap 140 of first insulation layer 120. Yoke 150 is typically formed using a plating process. A seed layer is formed over the area where yoke 150 is to be formed, and the plating procedure heretofore described is performed. This process results in yoke 150 having sides substantially parallel to the air bearing surface of the head. Yoke 150 is the connecting structure between bottom pole 114 and the top pole of the writer (the subsequent fabrication of which is described below with respect to FIG. 4g).

Figure 4F:
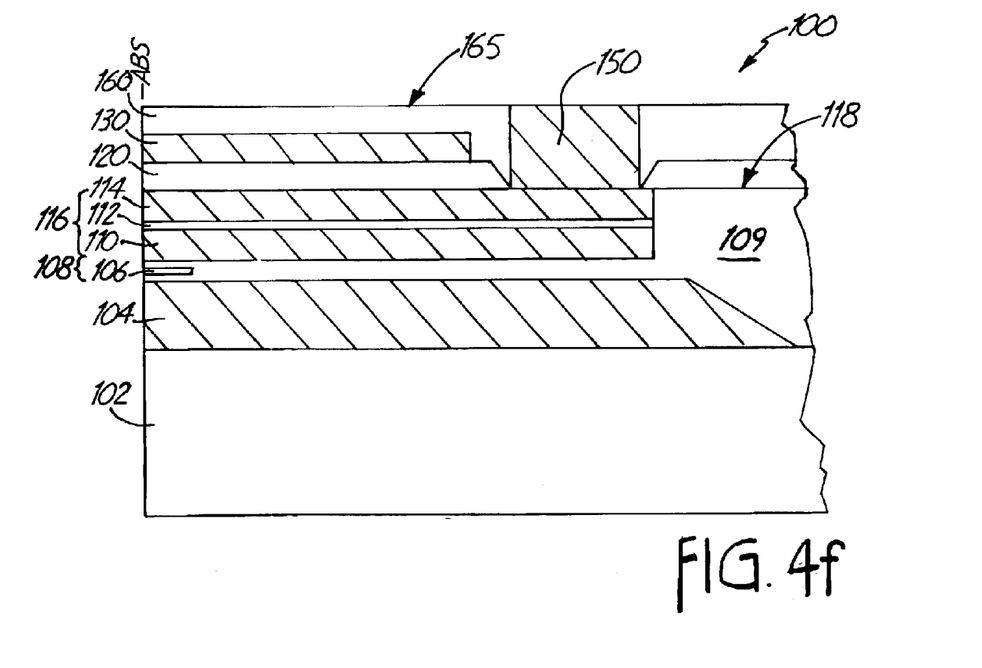
FIG. 4f is a cross-sectional view showing the sixth step of fabricating the perpendicular recording head according to the present invention.

FIG. 4f is a cross-sectional view showing the sixth step of fabricating a perpendicular recording head according to the present invention. Second insulation layer 160 is deposited over first insulation layer 120, coil 130, and yoke 150. This is typically accomplished by spinning second insulation layer 160 over the surface of the device to achieve a uniform spread. Because these various layers are at different depths relative to the top plane of the device, the top surface of second insulation layer 160 is uneven. To planarize the top surface, a CMP process is used to lap second insulation layer 160 down to the top of yoke 150. This leaves the top of yoke 150 exposed and forms common top surface 165.

Figure 4G:
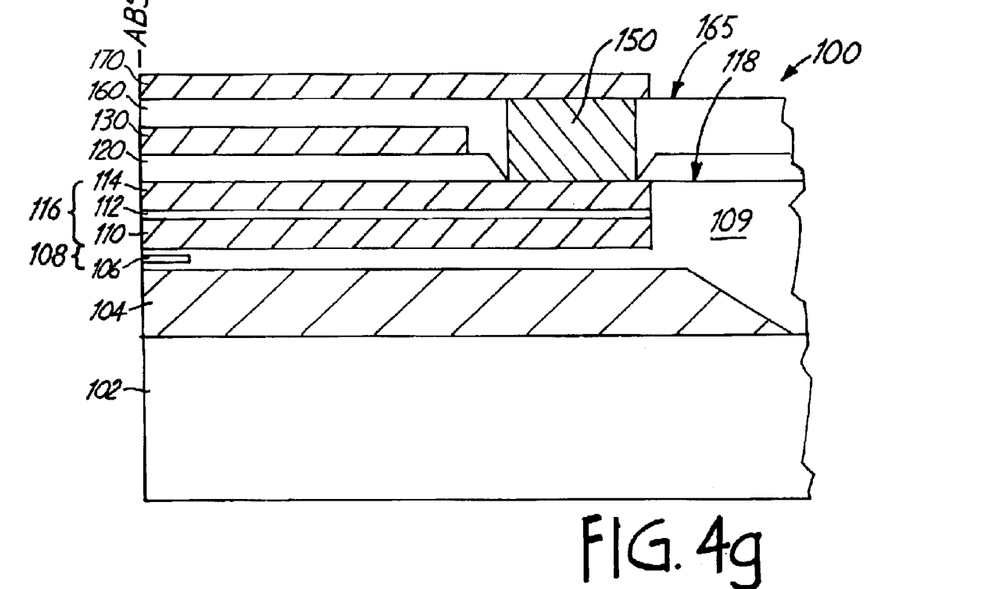
FIG. 4g is a cross-sectional view showing the seventh step of fabricating the perpendicular recording head according to the present invention.

FIG. 4g is a cross-sectional view showing the seventh step of fabricating a perpendicular recording head according to the present invention. After second insulation layer 160 is planarized to the top of yoke 150, top pole 170 is formed over flat polished surface 165 such that top pole 170 contacts yoke 150 at an end of top pole 170 distal from the air bearing surface. The planar and single piece structure of top pole 170 allows regular photolithography to be used to patter top pole 170 to a submicron width near the ABS, and facilitates precise control of a long saturation region of top pole 170. The planar and single piece structure of top pole 170 considerably enhances resolution of the photolithography. As a result, the geometry of top pole 170 can be controlled with high accuracy and a submicron writer width can be achieved by using photo technology. When top pole 170 is "bubble shaped" rather than substantially planar, a thick photoresist with a very high aspect ratio of the photoresist thickness to the desired pattern width must be used, which limits the resolution of the process. The planar structure of top pole 170 offers several additional advantages, such as a reduction of the magnetic core length and decreased switching time, controlled domain structure, the suppression of eddy currents due to the ability to use sputtered magnetic materials with high magnetic moment and resistivity or laminates for top pole 170, suppression of the writer sensitivity to the write current, simplified fabrication technology and enhanced manufacturing yield. These advantages are important to provide a relatively inexpensive device for achieving high speed, high density recording. Top pole 170 is composed of a high moment magnetic material with low coercivity and magnetostriction, high permeability and electrical resistivity, such as $Ni_{45}Fe_{55}$, CoFe, CoNiFe and FeTaN.

Figure 4H:
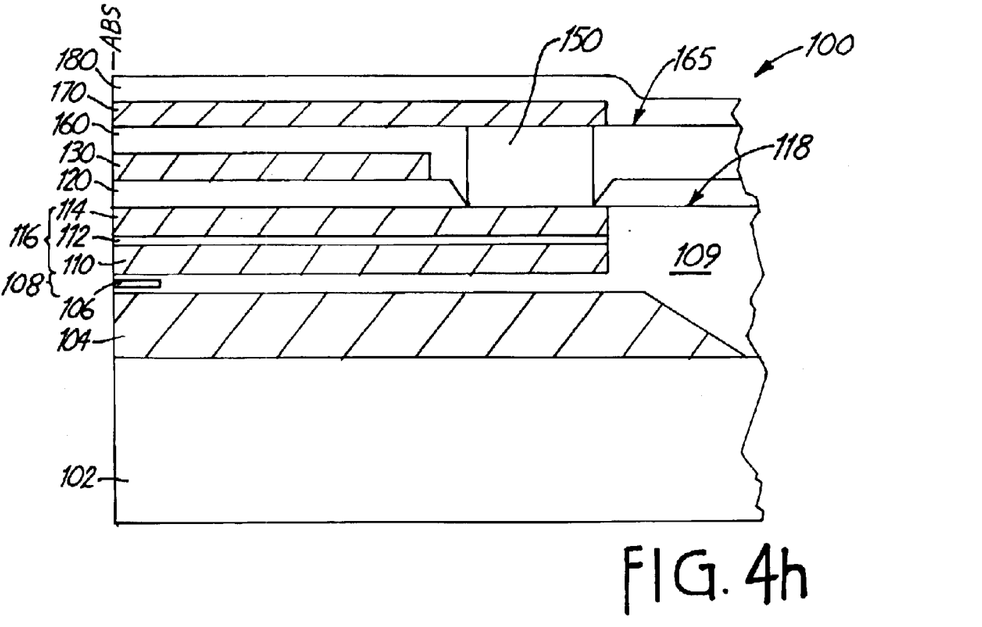
FIG. 4h is a cross-sectional view showing the eighth step of fabricating the perpendicular recording head according to the present invention.

FIG. 4h is a cross-sectional view showing the eighth step of fabricating a perpendicular recording head according to the present invention. Third insulation layer 180 is deposited over top pole 170 and common top surface 165. This is typically accomplished by spinning third insulation layer 180 over the top surface of the device to ensure an even spread of third insulation layer 180.

Figure 4I:
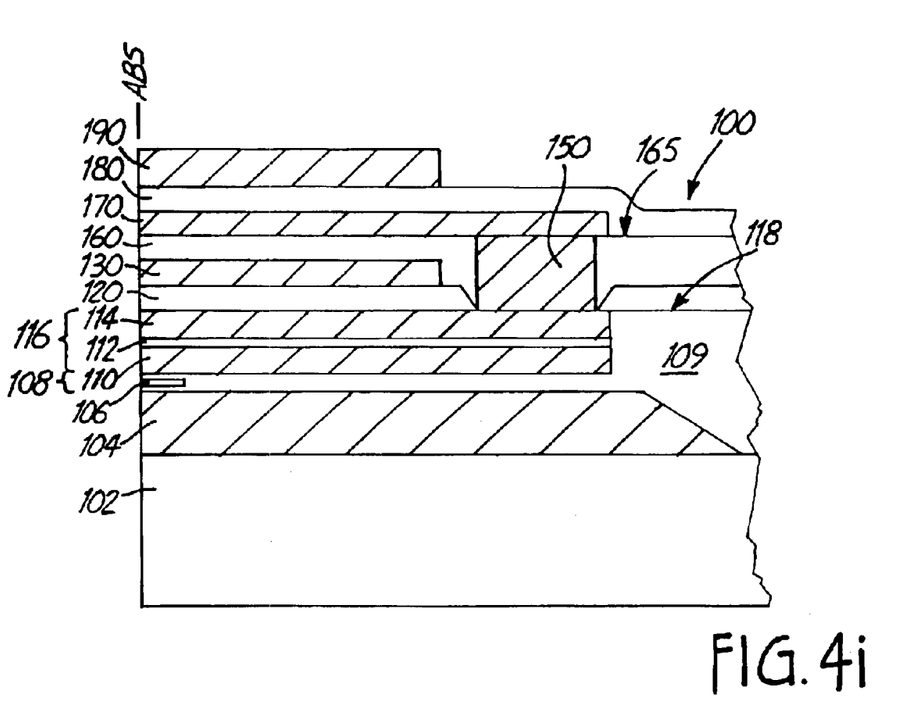
FIG. 4i is a cross-sectional view showing the ninth step of fabricating the perpendicular recording head according to the present invention.

FIG. 4i is a cross-sectional view showing the ninth step of fabricating a perpendicular recording head according to the present invention. Coil 190 is formed over first insulation layer 180. Coil 190 is typically formed using a plating process. A seed layer is formed over the area where coil 190 is to be formed, and the plating procedure heretofore described is performed. Coil 190 is substantially parallel to coil 130, and extends distally from the ABS to the same point relative to the ABS as coil 130. Coil vias (not shown here, for clarity) are then formed, extending from coil 130 to coil 190 so as to produce an electrical connection between coils 130 and 190. Coils 130 and 190 and the coil vias are preferably composed of Cu or NiPd, the latter of which is often used to avoid smearing at the ABS during lapping.

Figure 5:
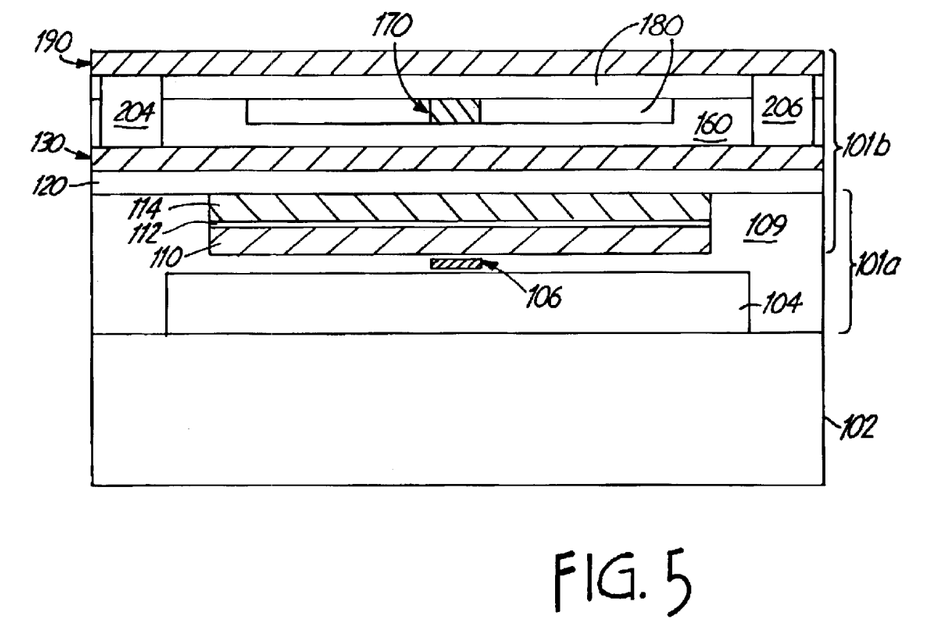
FIG. 5 is a cross-sectional view showing the structure of the perpendicular recording head as viewed from the air bearing surface (ABS).

FIG. 5 is a cross-sectional view showing the structure of perpendicular recording head 100 as viewed from the air bearing surface. As can be seen, the layers of reader portion 101a and writer portion 101b are formed in layers that are substantially parallel to one another. Because the layered configuration of the present invention does not require the fabrication intricacy of prior art device structures, smaller feature sizes (e.g., the distance from the ABS to the yoke) can be achieved than are possible using conventional head fabrication methods. With smaller feature sizes, the number of turns between coils 130 and 190 necessary to generate the magnetism needed to write to the magnetic medium is minimized to as few as one turn. This reduction in coil turns not only reduces the device area required for the coils, but also maximizes the efficiency of the device. In this preferred embodiment, coils 130 and 190 are connected at opposite ends of writer portion 101b by coil vias 204 and 206. The combination of coil 130, coil via 204, coil 190, and coil via 206 form a one-turn toroidal coil.

Furthermore, it should be noted that coil 130, coil 190, and coil vias 204 and 206 are exposed in this ABS view. This is beneficial over prior art designs because the magnetic flux propagating through top pole 170 is maximized at the ABS by having coils 130 and 190 exposed at the ABS. In other words, because the distance between the end of coils 130 and 190 proximal to the ABS and the ABS is minimized, the reduction in magnetic flux intensity through top pole 170 before reaching the magnetic medium is nominal. It should also be noted that prior to introduction of the completed device into a disc drive, a thin coating of diamond-like carbon (DLC) is preferably applied at the ABS. The DLC coating serves to protect coils 130 and 190, top pole 170, and read sensor 106 from exposure to possibly damaging impurities on the recording medium. However, its effect on the efficiency of the device is negligible.

Figure 6:
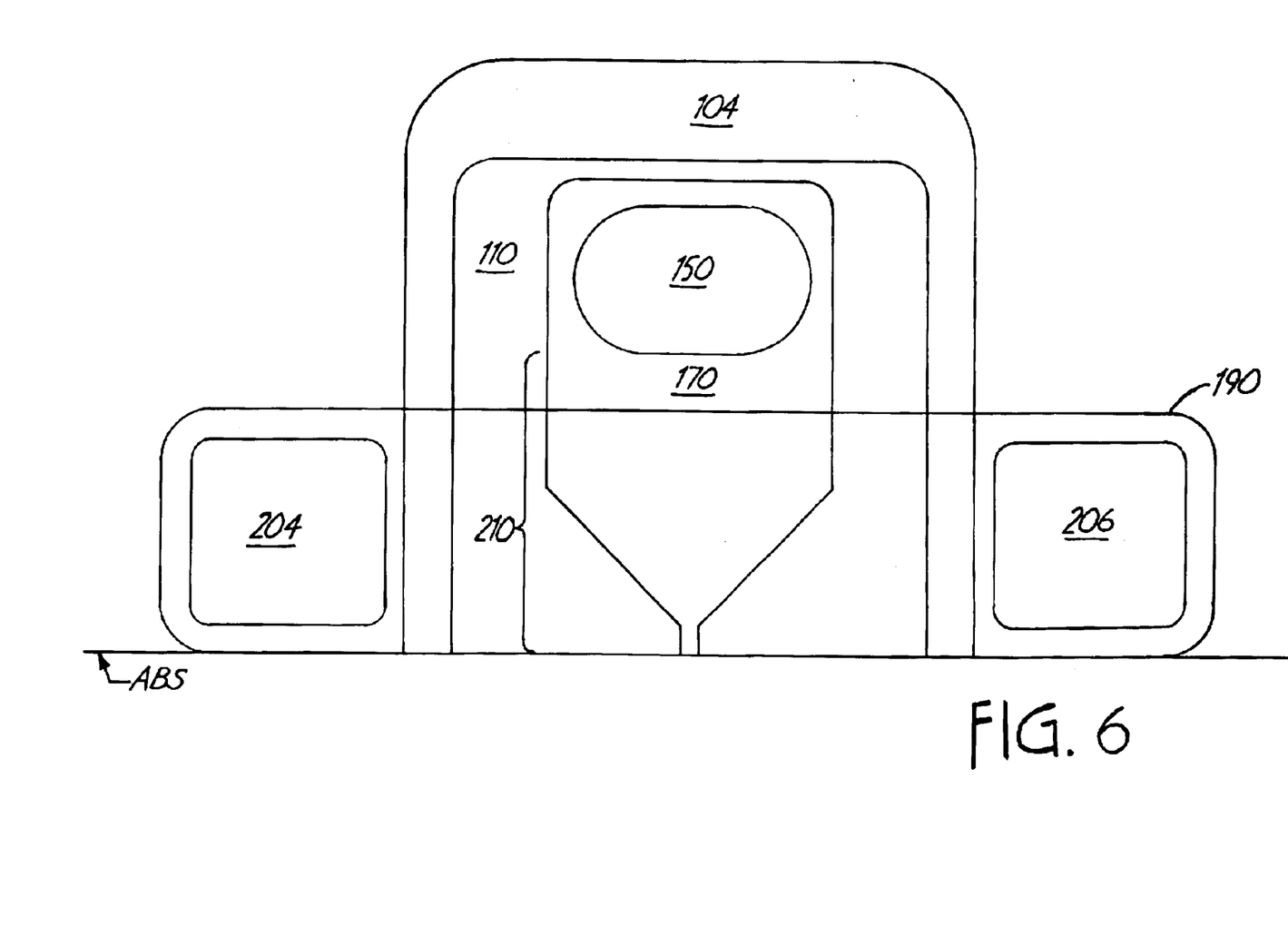
FIG. 6 is a top view of the perpendicular magnetic recording head according to the present invention.

FIG. 6 is a top view of perpendicular magnetic recording head 100 according to the present invention. In this view, the various structure layers are depicted transparently to show the relative locations and sizes of the structures. The structures shown in FIG. 6 are layered as follows, from front to back: coil 190, coil vias 204 and 206, top pole 170, yoke 150, top shield 110, and bottom shield 104. Because coil 190, coil vias 204 and 206, and coil 130 (FIG. 4) are exposed at the air bearing surface and preferably comprise one turn, the device area needed by coil 190, coil vias 204 and 206, and coil 130 (FIG. 4) is minimized. Therefore, the yoke length 210 (i.e., the distance between the bottom of yoke 150 and the ABS) can also be minimized. In the preferred embodiment shown in FIG. 6, yoke length 210 is two to three micrometers. This is a significant reduction in yoke length compared to conventional head designs that employ a solenoidal "wrapped" coil design, in which the yoke length can exceed twenty micrometers.

The present invention provides a perpendicular magnetic recording head having a coil with as few as a single turn wrapped toroidally around a top pole. The coil is exposed at the air bearing surface to minimize flux leakage to the coil proximal to the air bearing surface and to significantly reduce the size of the device compared to conventional head designs. Furthermore, the present invention provides a method of fabricating a perpendicular magnetic recording head in a novel fashion. The magnetic head structures are formed layer by layer on a planarized surface. By forming the various structures of the magnetic head on a planar surface, it is possible to fabricate small structures with easily controllable dimensions. The smaller device structures of the present invention require less coil turns and less coil current to generate the magnetism necessary to write to a magnetic medium than is necessary in conventional head designs.

Although the present invention has been described with reference to preferred embodiments, workers skilled in the art will recognize that changes may be made in form and detail without departing from the spirit and scope of the invention.

What is claimed is:

1. A perpendicular magnetic recording head having an air bearing surface for confronting a surface of a rotating disc, the perpendicular recording head having a writer portion comprising:

a substantially planar first pole;

a second pole;

a yoke connecting the first pole and the second pole distal from the air bearing surface; and a conductive coil around the first pole adjacent to the air bearing surface so that a proximal surface of the coil is coplanar with the air bearing surface, with a portion of the coil extending between the first pole and the second pole.

2. The perpendicular magnetic recording head of claim 1, wherein the conductive coil comprises a single turn toroid.

3. The perpendicular magnetic recording head of claim 1, wherein a distance from the air bearing surface to the yoke is about two to three micrometers.

4. A perpendicular magnetic recording head having an air bearing surface for confronting a surface of a rotating disc, the perpendicular recording head comprising:
   a substrate;
   a reader portion on the substrate, the reader portion comprising a bottom shield,
   a read sensor and a shared pole; and
   a writer portion on the reader portion, the writer portion comprising:
   the shared pole;
   a yoke extending from the shared pole substantially parallel to the air bearing surface at a region distal from the air bearing surface;
   a substantially planar top pole extending substantially normal to the air-bearing surface, the top pole contacting the yoke at the region distal from the air bearing surface; and
   a conductive coil around the top pole adjacent to the air bearing surface so that a proximal surface of the coil is coplanar with the air bearing surface, with a lower portion of the coil extending between the top pale and the shared pole.

5. The perpendicular magnetic recording head of claim 4, wherein the conductive coil comprises a single turn toroid.

6. The perpendicular magnetic recording head of claim 4, wherein a distance from the air bearing surface to the yoke is about two to three micrometers.

7. A perpendicular magnetic read/write head having an air bearing surface confronting a magnetic disc, the head comprising:
   a substrate wafer;
   a read sensor structure on the substrate wafer;
   a first insulation layer over the read sensor structure;
   a first coil layer having a proximal surface coplanar with the air bearing surface and extending distally from the air bearing surface over a portion of the first insulation layer;
   a channel through the first insulation layer at an end of the first coil layer distal from the air bearing surface;
   a yoke in the channel of the first insulation layer;
   a second insulation layer over the first coil layer and around the yoke, the second insulation layer and the yoke lining a planar top surface;
   a top pole on the planar top surface over the second insulation layer and yoke, a portion of the top pole in contact with the yoke;
   a third insulation layer over the top pole;
   a second coil layer haviug a proximal surface coplanar with the air bearing surface and extending distally from the air bearing surface over a portion of the third insulation layer; and
   vias connecting the first and second coil layers.

8. The head of claim 7, wherein the read sensor structure includes a combined shield layer and bottom writer pole.

9. The head of claim 7, wherein the read sensor structure has a shield layer and a bottom writer pole separated by a magnetic insulator layer.

10. The head of claim 7, wherein the first coil layer and second coil layer form a single turn.

11. The head of claim 7, wherein the yoke has sides substantially parallel to the air bearing surface.

12. The head of claim 7, wherein the yoke is positioned about two to three micrometers from the air bearing surface.

13. A writer for perpendicular magnetic head having an air bearing surface, the writer comprising:
   a planar top pole;
   a planar bottom pole parallel to the planar top pole;
   a yoke connecting the top pole and the bottom pole; and
   a vertical coil having an upper layer over the top pole and lower layer between the bottom pole and the top pole, the vertical coil having a proximal surface exposed at and coplanar with the air bearing surface.

14. The writer of claim 13 and further comprising:
   a first insulation layer between the bottom pole and the lower layer of the vertical coil;
   a second insulation layer between the lower layer and the top pole; and
   a third insulation layer between the top pole and the upper layer of the vertical coil.

15. The writer of claim 14 wherein the yoke extends through the second insulation layer.

16. The writer of claim 13 wherein the top pole is composed of a high moment magnetic material.

17. The writer of claim 13 wherein the yoke is spaced from the air bearing surface by a yoke length of about two to three micrometers.

18. The writer of claim 13 wherein the vertical coil is a one-turn toroidal coil.

19. The writer of claim 13 and further comprising a diamond like carbon (DLC) coating on the air bearing surface.

20. The writer of claim 13 wherein the upper layer and lower layer of the vertical coil are connected by a via.

* * * * *

UNITED STATES PATENT AND TRADEMARK OFFICE
CERTIFICATE OF CORRECTION

PATENT NO. : 6,876,518 B2 Page 1 of 1
DATED : April 5, 2005
INVENTOR(S) : Sakhrat Khizoroev et al.

It is certified that error appears in the above-identified patent and that said Letters Patent is hereby corrected as shown below:

<u>Column 9,</u>
Line 30, delete "pale", insert -- pole --.

<u>Column 10,</u>
Line 5, delete "haviug", insert -- having --.

Signed and Sealed this

Eighth Day of November, 2005

JON W. DUDAS
*Director of the United States Patent and Trademark Office*